UNITED STATES PATENT OFFICE.

PAUL JULIUS AND AKIM TKATSCH, OF LUDWIGSHAFEN, GERMANY, ASSIGNORS TO THE BADISCHE ANILIN AND SODA FABRIK, OF SAME PLACE.

PROCESS OF MAKING YELLOW PHOSPHIN DYE.

SPECIFICATION forming part of Letters Patent No. 619,577, dated February 14, 1899.

Application filed October 27, 1898. Serial No. 694,724. (No specimens.)

*To all whom it may concern:*

Be it known that we, PAUL JULIUS, a subject of the Emperor of Austria-Hungary, and AKIM TKATSCH, a subject of the Czar of Russia, both doctors of philosophy, residing at Ludwigshafen-on-the-Rhine, in the Kingdom of Bavaria and Empire of Germany, have invented new and useful Improvements in Processes for the Production of Yellow Coloring-Matter, of which the following is a specification.

Our invention relates to improvements in the process described in application Serial No. 663,731, filed December 27, 1897, for the production of acridin coloring-matters. According to the process of the said specification para-amido-benzaldehyde or alkyl derivatives thereof, alkylated in the amido group, are condensed with alphyl derivatives of meta-toluylene-diamin. The present invention relates to an improvement in this process, which consists mainly in carrying out the aforesaid condensation in the presence of ferric chlorid, and it is preferred to work in alcoholic solution. The explanation of the manner in which the ferric chlorid acts is perhaps to be found in the following circumstances: From theoretical considerations the reaction as described in the aforesaid application, Serial No. 663,731, might be expected to lead to the leuco products of dyes of the phosphin class; but instead of that the dyes themselves are obtained. It appears probable that this takes place at the expense of the reduction of some of the products present, involving the occurrence of some by-reactions, and it is experimentally observed that by-reactions do take place when working in the manner described. By working according to the present invention in the presence of ferric chlorid the oxidizing agent requisite for the production of the coloring-matters themselves is provided and the dyes are obtained in much larger quantities from the same quantity of initial materials and the waste due to the by-reactions is largely avoided.

We give the following examples to illustrate the manner in which our invention can best be carried into practical effect. Parts are by weight:

Example 1: Dissolve about fifty-five (55) parts of phenyl-meta-toluylene-diamin-hydrochlorate in one hundred and sixty (160) parts of hot alcohol, and add to the solution a mixture of about twenty-four (24) parts para-amido-benzaldehyde and fifty (50) parts of solid ferric chlorid, ($Fe_2Cl_6+6H_2O$.) Boil the mixture for about six (6) hours in a vessel furnished with an inverted condenser. Then distil off the alcohol and extract the residue with about two thousand (2,000) parts of hot water while stirring thoroughly. Filter the solution so obtained. The coloring-matter may be separated from the solution in various ways. For instance, add to the hot filtrate about fifty-five (55) parts of nitric acid, (containing about sixty-two per cent. of real nitric acid, $HNO_3$.) Allow to stand for about twenty-four (24) hours. The coloring-matter separates out as a heavy yellow-red precipitate. Filter, press, and dry at a low temperature—say about forty (40) to fifty (50) degrees.

Example 2: Dissolve about twenty-seven and a half (27.5) parts of phenyl-amido-toluylene-diamin-hydrochlorate in sixty (60) parts of hot alcohol. Boil the solution and add gradually a mixture of about fifteen (15) parts of di-methyl-para-amido-benzaldehyde dissolved in forty (40) parts of alcohol and twenty-five (25) parts of ferric chlorid, ($Fe_2Cl_6+6H_2O$,) also dissolved in forty (40) parts of alcohol. Boil the entire mixture for about five (5) hours, distil off the alcohol, and extract the residue with about four thousand (4,000) parts of boiling water. Allow to cool and to stand for several hours, filter from any precipitated impurity, and add about twenty-three (23) parts of hydrochloric acid (containing about thirty per cent. HCl) and five hundred and forty (540) parts of a solution of sodium nitrate, (containing about forty-two and one-half per cent., by weight, of this salt.) Allow the mixture to stand for about ten (10) hours while keeping it cool with ice. A voluminous red crystalline mass fills the liquid. Filter, press, and dry at about 40° to 50° centigrade.

Now what we claim is—

1. The improved process for the production of coloring-matter, consisting in heating together para-amido-benzaldehyde, and an alphyl-meta-toluylene-diamin in alcoholic solution, and in the presence of ferric chlorid, substantially as described.

2. The improved process for the manufacture of coloring-matter by heating together alkylated para-amido-benzaldehyde, and alphyl-meta-toluylene-diamin in alcoholic solution, in the presence of ferric chlorid.

In testimony whereof we have hereunto set our hands in the presence of two subscribing witnesses.

PAUL JULIUS.
AKIM TKATSCH.

Witnesses:
ERNEST T. EHRHARDT,
HEINRICH KAUTHER.